United States Patent [19]

Takabatake

[11] 4,162,414
[45] Jul. 24, 1979

[54] GENERATOR UNIT WITH BUILT-IN THERMALLY PROTECTED VOLTAGE REGULATOR

[75] Inventor: Yoshinobu Takabatake, Kariya, Japan

[73] Assignee: Nippondenso Co., Ltd., Aichi, Japan

[21] Appl. No.: 787,152

[22] Filed: Apr. 13, 1977

[30] Foreign Application Priority Data

Apr. 21, 1976 [JP] Japan .................... 51-50221[U]

[51] Int. Cl.² ............................................. H02K 11/00
[52] U.S. Cl. .................................. 310/68 R; 310/58; 310/89; 310/91
[58] Field of Search ............... 310/52, 58, 60, 171, 310/53, 159, 59, 91, 64, 65, 89, 90, 68, 68 D, 72, 68 C, 66; 123/148 CC; 318/242

[56] References Cited

U.S. PATENT DOCUMENTS

| | | | |
|---|---|---|---|
| 3,329,840 | 7/1967 | Binder | 310/68 R |
| 3,538,362 | 11/1970 | Cheetham | 310/171 |
| 3,553,505 | 1/1971 | Sato | 310/68 D |
| 3,586,892 | 6/1971 | Sato | 310/68 R |
| 3,614,593 | 10/1971 | Lace | 310/68 R |
| 3,666,978 | 5/1972 | Renner | 310/65 |
| 3,748,509 | 7/1973 | Karcher | 310/68 D |
| 3,970,881 | 7/1976 | Sato | 310/68 D |
| 4,051,400 | 9/1977 | Armor | 310/58 |

Primary Examiner—R. Skudy
Attorney, Agent, or Firm—Frishauf, Holtz, Goodman & Woodward

[57] ABSTRACT

A frame member for the voltage regulator spaces the latter from the stator core and from an insulating plate on the bearing cover which also supports the voltage regulator, so as to maintain an air space between the stator core and the frame member which serves as a window for the intake of cooling air into the generator. The cooling air cools the regulator, as well as the stator core and winding, and the air gap reduces the heat transfer from the stator core and winding to the regulator.

3 Claims, 1 Drawing Figure

U.S. Patent
Jul. 24, 1979
4,162,414
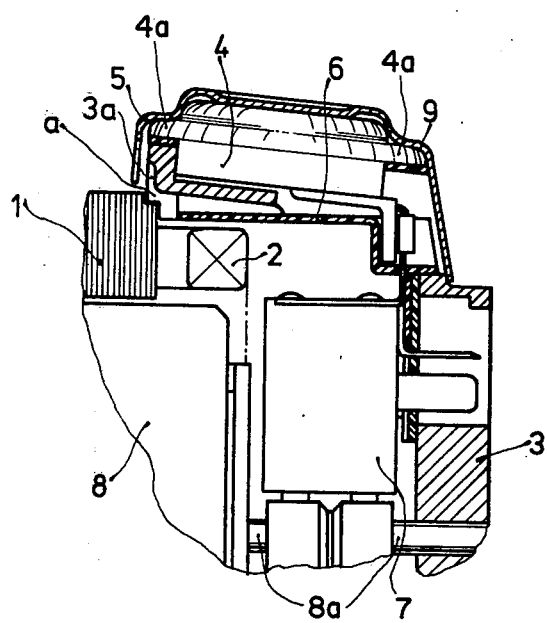

GENERATOR UNIT WITH BUILT-IN THERMALLY PROTECTED VOLTAGE REGULATOR

This invention concerns a generator unit for a vehicle including an alternator and a built-in voltage regulator. As is known, there is usually also built into the generator unit a rectifier unit and the voltage regulator operates to control the excitation of the field winding, which is mounted on the rotor of the generator.

In the heretofore known kinds of generator units of the kinds just mentioned, the mounting frame or chassis of the voltage regulator was mounted wholly or mostly on the stator core of the generator, with the result that the heat transfer resistance between the stator core and the voltage regulator was very low. The heat generated in the stator winding and in the stator core therefore very heavily influenced the operation of the regulator. In consequence, the temperature of the voltage regulator could occasionally exceed the maximum permissible upper limit, leading to damage to the regulator.

It is an object of the present invention to overcome the disadvantages arising from excessive heat transfer between the stator of the generator and the voltage regulator.

SUMMARY OF THE INVENTION

Briefly, the regulator mounting frame is so supported on the stator core and on an insulating plate located between the regulator and the interior of the generator unit as to maintain a gap of free space between the stator core and the housing of the regulator. This free space gap operates as the inlet window for cooling air that is drawn into the generator by a fan mounted on its shaft. Moreover, a heat baffle plate is also preferably provided between the housing of the regulator and the frame member that supports the regulator with reference to the stator core and the insulating plate.

The invention has the advantage compared to the devices heretofore known that the temperature of the regulator does not get above the permissible operating temperature range. The heat transfer resistance between the stator core and the regulator is increased and the heat transfer accordingly reduced. The cooling air drawn through the gap maintained in accordance with the invention reduces the influence of the heat radiated by the stator winding.

The invention is described by way of illustrative example with reference to the single FIGURE of the annexed drawing, which is a cross-section of a portion of a generator unit showing the mounting of the regulator in accordance with the present invention.

The drawing shows part of a stator winding 2 wound on a stator core 1. A bearing cover 3, a casing member relatively remote from the driving elements of the generator, carries an insulating plate 6 affixed to a frame member 3a that supports a regulator 4 for the generator unit. The frame member 3a bears against the stator core 1, thus holding the insulating plate 6 away from the core 1. The configuration of the frame member 3a is such as to maintain a free space gap between the stator core 1 and the frame 3a that serves as an air intake window for the cooling system of the generator unit. The regulator 4 is held on a base flange member 4a and is preferably constructed so as to use integrated circuit units and operates so as to control the voltage produced in the stator winding 2, for example by controlling the excitation current in the field winding (not shown in the drawing). A cover 5 fits over the outside of the regulator 4. The insulating plate 6 which is held by the frame member 3a and the bearing cover 3 is preferably a plastic resin molding that separates the voltage regulator 4 from the inner portion of the generator. On the bearing cover 3, there is mounted a brushholder 7. A portion of the rotor 8 of the generator, which is mounted on the shaft 8a, is visible in the drawing. Furthermore, a heat baffle plate 9 is inserted between the base member 4a of the voltage regulator 4 and the frame member 3a. The latter is of a configuration that enables it to cover the underside of the regulator 4.

On account of the provision of the air intake window between the frame 3a and the stator core 1, the transfer of heat from the stator winding 2 and the stator core 1 to the regulator is reduced and, at the same time, the cold air flowing in from the outside cools the regulator 4, as well as also the stator winding 2 and the stator core 1. The insulating plate 6 and the heat baffle plate 9 are inserted in the structure to assure that there will be sufficient reduction of heat transfer. By the provision of the insulating plate 6 and the heat baffle plate 9, the radiant heating produced by the stator winding 2 and by the stator core is to a great extent screened off from the heat sensitive regulator.

Although the invention has been described with reference to a particular illustrative embodiment, variations are possible within the inventive concept.

We claim:

1. A generator unit for a vehicle comprising an alternating current generator having a shaft, a stator core (1) and a casing including a bearing cover (3) affixed to a bearing that holds said shaft, and further comprising:
    a voltage regulator unit (4) mounted on a portion of the periphery of said bearing cover (3) and having a base member (4a) for facilitating mounting;
    a frame member (3a) for supporting said regulator by its base member (4a) with reference to said bearing cover (3) and holding said regulator away from said stator core (1) in such a way that a free space gap (a) is provided between said stator core (1) and the said voltage regulator (4),;
    an insulating plate (6) mounted on said frame member (3a) between said voltage regulator (4) and the interior of said casing in such a way as to leave a gap between said insulating plate (6) and said stator core (1) which communicates with said gap between said core (1) and said voltage regulator (4); and
    a cover (5) for said voltage regulator (4) fitting thereover outwardly from said bearing cover (3) and leaving a gap between itself and said core (1) so as to allow air to enter therethrough into said gap between said core and said voltage regulator.

2. A generator unit as defined in claim 1, in which said free space gap (a) between stator core (1) and said assembly of said voltage regulator (4), said base member (4a) and said cover (5) communicates wth the interior of the generator unit in such a way that it serves as a window for introducing cooling air into said generator.

3. A generator unit as defined in claim 2, in which a heat baffle plate (9) is provided substantially between said base member (4a) and said frame member (3a).

* * * * *